United States Patent [19]

Konersmann

[11] Patent Number: 4,672,850
[45] Date of Patent: Jun. 16, 1987

[54] APPARATUS FOR MEASURING THE VIBRATIONS OF A SPIRAL BEVEL GEAR DRIVE ON A GEAR TESTING MACHINE

[75] Inventor: Erhard Konersmann, Wallisellen, Switzerland

[73] Assignee: Werkzeugmaschinenfabrik Oerlikon-Bührle AG, Zürich, Switzerland

[21] Appl. No.: 827,863

[22] Filed: Feb. 10, 1986

[30] Foreign Application Priority Data

Feb. 27, 1985 [CH] Switzerland ............... 00893/85

[51] Int. Cl.[4] ............................................. G01N 29/04
[52] U.S. Cl. ............................................................. 73/593
[58] Field of Search ........................ 73/593, 660, 162

[56] References Cited

U.S. PATENT DOCUMENTS

| | | |
|---|---|---|
| 3,677,072 | 7/1972 | Weichbrodt et al. ............... 73/593 |
| 3,745,815 | 7/1973 | Bentone et al. ..................... 73/593 |
| 4,252,023 | 2/1981 | Pommernacki ..................... 73/593 |
| 4,335,612 | 6/1982 | Yasugi et al. ....................... 73/593 |

OTHER PUBLICATIONS

Patent Abstracts of Japan, vol. 8, No. 31 of 2/9/84 (p. 253) (1468).

Primary Examiner—Anthony V. Ciarlante
Attorney, Agent, or Firm—Werner W. Kleeman

[57] ABSTRACT

For evaluating running quality of gears, a vibration measuring apparatus with a vibration pickup or sensor is provided at least at a headstock for holding a gear wheel a bevel gear or pinion. The signal pickup or reception of the vibration pickup or sensor is processed by suitable evaluation devices. A measuring ring is provided at the headstock in order to detect the maximum vibration components independently of the design of the gear set. The measuring ring carries the vibration pickup and is rotatably mounted on an associated spindle and can be rotated and positionally fixed relative to the headstock.

5 Claims, 3 Drawing Figures

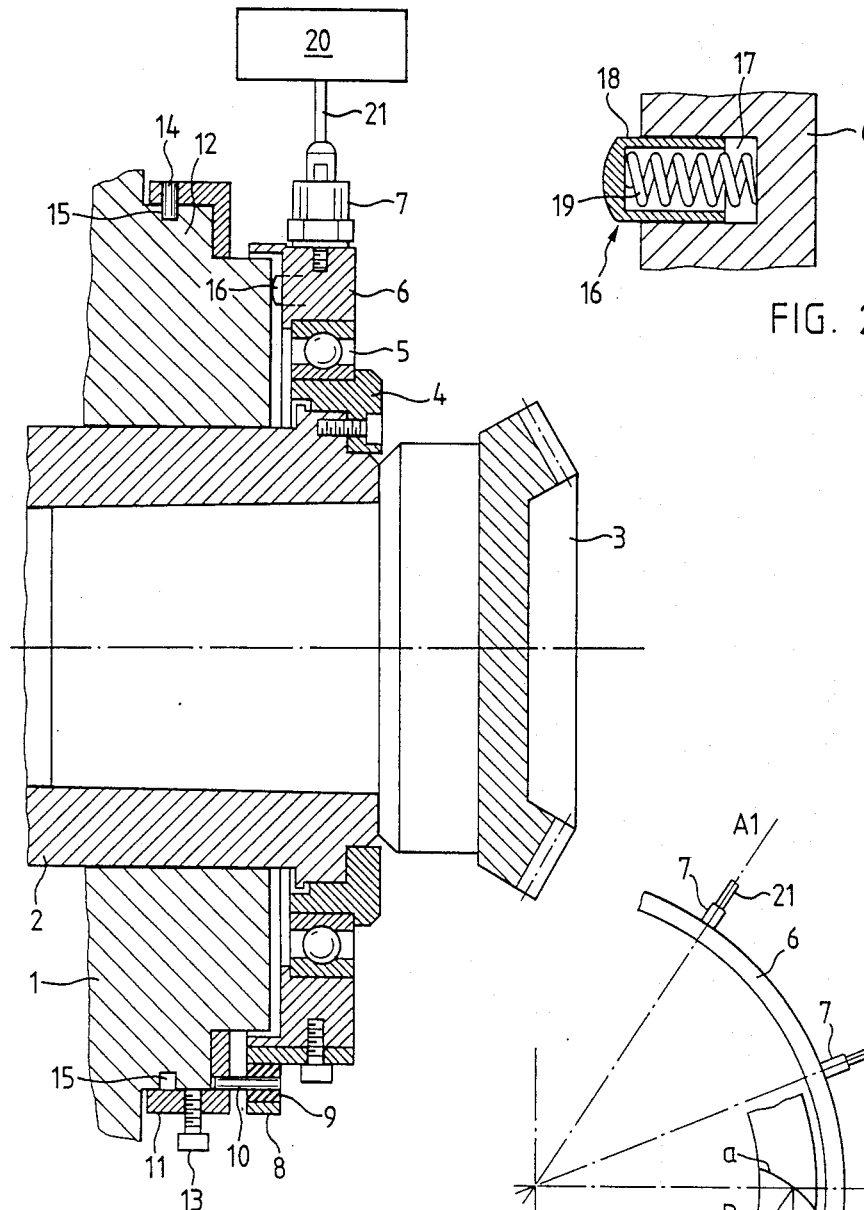

APPARATUS FOR MEASURING THE VIBRATIONS OF A SPIRAL BEVEL GEAR DRIVE ON A GEAR TESTING MACHINE

BACKGROUND OF THE INVENTION

The present invention broadly relates to a new and improved construction of an apparatus for measuring the vibrations of gears, especially a spiral bevel gear drive or transmission on a gear testing machine.

In its more particular aspects, the present invention relates to a new and improved construction of an apparatus for measuring the vibrations of a spiral bevel gear drive or transmission on a gear testing machine in which one gear or gear wheel is clamped to or mounted on a headstock to or on an associated spindle. The measuring apparatus possesses a vibration pickup or sensor as well as evaluation devices for evaluating the quality of the gear set.

Measuring apparatuses for measuring mechanical vibrations and impacts also serve for evaluating the quality of gear drives especially the quality of the operating noise. Examples are acceleration pickups as well as vibration pickups, contact microphones, electro-mechanical transducers and piezo-electric transducers. These are fastened to the vibrating object and are connected with an electrical measuring apparatus by means of a flexible cable. The measuring apparatus delivers a frequency analysis with resolution of sonic and vibration signals for example, for comparison with a frame or image mask.

A gear tooth testing machine for testing operating noise in dependence of loading, rotary speed and center spacing is known to the art from Swiss Pat. No. 568,561 or German Pat. No. 2,434,209, respectively. In this machine the spindles are hydrostatically journalled and the pressure alterations in the oil pockets are measured as sonic signals in the liquid. At the radial bearings two oppositely positioned hydraulic oil pockets, usually the vertically arranged pockets on which the applied torsion moment acts, are used as measuring points. Furthermore, according to the disclosure of the abovementioned Swiss patent, it is known to perform a measurement of the acoustic conduction within a body with the aid of a piezo-electrical converter or transducer for evaluating the quietness of running of gears.

In these known measuring systems the signal receivers or pickups are stationarily installed and only the vertical components of the gear meshing force serves for the measurement. This vertical component, however, is dependent on the geometry of the bevel gear set, for instance, on the spiral or helix angle which can amount up to 55°, and in hypoid gear drives, on the displacement of the axes. The result of this is that for helix angles which deviate from 0° and for axes which are displaced from one another vibration measurements carried out in a fixed direction can only evaluate a partial vibration signal.

SUMMARY OF THE INVENTION

Therefore with the foregoing in mind, it is a primary object of the present invention to provide a new and improved construction of an apparatus for measuring the vibrations of gears, especially a spiral bevel gear drive or transmission on a gear testing machine which does not exhibit the aforementioned drawbacks and shortcomings of the prior art constructions.

Another important object of the present invention is to provide an improved apparatus for measuring vibrations in which, independently of the momentary design of the gear set, the maximum possible vibration components are transmitted to the vibration pickup.

Now in order to implement these and still further objects of the invention, which will become more readily apparently as the description proceeds, the measuring apparatus of the present invention for measuring the vibrations of a spiral bevel gear drive on a gear testing machine is manifested the features that it comprises a measuring ring arranged at least at a headstock and carrying a vibration pickup. The measuring ring is rotatably mounted on an associated spindle and can be rotated and fixed relative to the headstock.

The advantages achieved by the invention can be seen essentially in that by selectively rotating the measuring ring with the vibration pickup fixed thereto into an appropriate radial measuring position and fixing the thus adjusted measuring ring in such position there can be readily detected the maximum vibration components in the radial measuring direction in a most simple manner for each design of gear set.

A further advantage of the present invention is achieved in that the influence of the extraneous or spurious noise level is reduced.

Furthermore, this measuring ring arrangement can be utilized either on the pinon or on the bevel or crown wheel sides of a bevel gear set.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 1 shows in section one embodiment of an apparatus for measuring the vibrations of a spiral bevel gear drive or transmission on a gear testing machine and depicting a portion of the headstock with a bevel gear mounted thereat;

FIG. 2 shows an enlarged section of a biasing element of the measuring apparatus in accordance with FIG. 1; and FIG. 3 shows schematically the interdependence of the contact position, contact forces and the vibration pickup position of the measuring apparatus in accordance with FIG. 1.

DETAILED DESCRIPTION OF THE PREFERRED EMBODIMENTS

Describing now the drawings, it is to be understood that to simplify the showing thereof, only enough of the structure of the apparatus for measuring the vibrations of a spiral bevel gear set on a gear testing machine has been illustrated therein as is needed to enable one skilled in the art to readily understand the underlying principles and concepts of the present invention. Turning now specifically to FIG. 1 of the drawings, the measuring apparatus illustrated therein by way of example and not limitation will be understood to essentially depict only the inventive portions of the apparatus for measuring vibrations which is otherwise known as such and is here not otherwise further shown or described.

A bevel gear 3 is clamped or mounted in known manner on the spindle 2 of a headstock 1 of a gear testing machine. A mounting ring or ring member 4 is fastened without play to the end of the spindle 2. A ball bearing 5 is fitted to the mounting ring 4 also without play. The outer race of the ball bearing 5 is enclosed without play by a measuring ring or ring member 6. A vibration sensor or pickup 7, for example, a piezo-electric converter or transducer, and an entrainment member 8 which possesses a bushing 9 of elastic material and a carrier or entrainment pin 10 anchored therein are radially fastened to the measuring ring 6. An adjusting or adjustment ring 11 possesses a bore or hole in its front side into which the carrier or entrainment pin 10 engages. The adjusting ring 11 is rotatably arranged at a flange 12 of the headstock 1 and may be fixed by means of one or more bolts 13 arranged about the circumference of the flange 12. Pins 14 are filled at the circumference of the adjusting ring 11 and engage in a recess 15 of the flange 12 to ensure proper guidance of the adjusting ring 11. The vibration pickup 7 is connected to commercially available evaluation devices or evaluation means 20 by means of a flexible cable 21.

In accordance with FIG. 2, bracing or biasing elements 16 are provided at a face of the measuring ring 6 confronting the headstock 1 in order to preload the ball bearings 5 free of play. The biasing elements 16 comprise, for example, a crowned or domed hollow piston or plunger 18 which is axially and displaceably arranged in a bore 17 in the measuring ring or ring member 6. A spring 19 is arranged within the piston 18 and the bore 17.

In FIG. 3 there are shown two contact positions A and B for two separate spiral bevel gear drives and respectively corresponding tooth flanks a and b at the bevel gear 3. Furthermore, there can be seen the measuring ring 6 with the vibration pickup 7 in the corresponding measuring positions A1 and B1. The contact position A corresponds to a gear drive without a displacement of its axes but with a spiral or helix angle of about 30° The tooth contact force P acts perpendicularly to the tooth flank a. When, as taught by the state of the art, the signal or vibration pickup is situated in the vertical axis of the gear, then only the vertical force component $P_v$ acts on the signal or vibration pickup 7. In accordance with the invention, after loosening the bolts 13, the adjusting ring 11 and thus also the measuring ring 6 with the vibration pickup 7 can now be moved relative to the headstock 1 through an angle which approximates that of the spiral or helix angle, into a new position A1 and can be fixed again by tightening the bolts 13. In this position A1 the vibration components, which are nearly the maximum possible act on the vibration pickup 7 in the radial direction. The evaluation of the measured vibrations occurs in known manner via the evaluation devices 20 and thus is here not further described.

The contact position B corresponds to a gear drive with supplementary displacement of the gear axes, also called a hypoid gear drive. Here the reduction of the vertical force components $P_v$ compared to the tooth contact force P is made clear. In accordance with the invention the adjusting ring 11 is again turned or rotated until the vibration pickup 7 reaches the position B1. This position B1 is determined by the sum of the spiral or helix angle and the angle of the displacement of the axes of the hypoid gears. Thereafter the adjusting ring 11 is fixed in position by the bolts 13 in order to prevent inadvertent rotation.

The inventive apparatus can be used on the bevel or crown wheel spindle as well as on the pinion spindle.

While there are shown and described present preferred embodiments of the invention, it is to be distinctly understood that the invention is not limited thereto, but may be otherwise variously embodied and practiced within the scope of the following claims.

Accordingly, what I claim is:

1. An apparatus for measuring the vibrations of a spiral bevel gear drive on a gear testing machine having a headstock and a spindle for mounting a gear of the spiral bevel gear drive, comprising:
   a vibration pickup device;
   at least one evaluation device for evaluating the quality of said spiral bevel gear drive and cooperating with the vibration pickup device;
   a measuring ring arranged at said headstock for carrying said vibration pickup device;
   means for rotatably mounting said measuring ring on said spindle; and
   means for positionally fixing said rotatably mounted measuring ring in a selected position in relation to said headstock.

2. The apparatus as defined in claim 1, wherein:
   said mounting means mounts said measuring ring on said spindle free of play.

3. The apparatus as defined in claim 2, wherein:
   said mounting means comprises a ball bearing interposed between said spindle and said measuring ring; and
   biasing elements arranged at said measuring ring for biasing the ball bearing to be essentially free of play.

4. The apparatus as defined in claim 1, further including:
   an entrainment member elastically connecting said measuring ring with said headstock.

5. The apparatus as defined in claim 1, wherein:
   said vibration pickup comprises a piezo-electrical transducer.

* * * * *

UNITED STATES PATENT AND TRADEMARK OFFICE
CERTIFICATE OF CORRECTION

PATENT NO. : 4,672,850

DATED : June 16, 1987

INVENTOR(S) : ERHARD KONERSMANN

It is certified that error appears in the above-identified patent and that said Letters Patent is hereby corrected as shown below:

Column 2, line 8, please delete "apparently" and insert --apparent--

Column 2, line 11, please insert after "manifested" the word --by--

Column 3, line 18, please delete "filled" and insert --fitted--

Signed and Sealed this

Seventeenth Day of November, 1987

Attest:

DONALD J. QUIGG

*Attesting Officer*   *Commissioner of Patents and Trademarks*